United States Patent [19]

Robbins, III

[11] Patent Number: 4,913,873

[45] Date of Patent: Apr. 3, 1990

[54] METHOD OF FORMING A TRUCK BED LINER

[76] Inventor: Edward S. Robbins, III, 459 North Ct., Florence, Ala. 26360

[21] Appl. No.: 291,367

[22] Filed: Dec. 30, 1988

Related U.S. Application Data

[63] Continuation of Ser. No. 78,676, Jul. 28, 1987, abandoned.

[51] Int. Cl.⁴ ............................................. B29C 45/14
[52] U.S. Cl. ................................... 264/516; 156/287; 264/547; 264/553
[58] Field of Search ............... 296/39.2; 264/510, 511, 264/512, 516, 291, 292, 547, 553; 425/61, 62, 383, 387.1, 388, 403; 156/285, 286, 287

[56] References Cited

U.S. PATENT DOCUMENTS

| | | | |
|---|---|---|---|
| 2,660,761 | 12/1953 | Peters | 156/287 |
| 2,876,498 | 3/1959 | Nason | 264/516 |
| 3,066,211 | 11/1962 | Vogt | 264/553 |
| 3,157,719 | 11/1964 | Ferrari | 264/516 |
| 3,161,553 | 12/1964 | Visser | 156/156 |
| 3,467,741 | 9/1969 | Kesling | 264/510 |
| 3,513,051 | 5/1970 | Lichfield | 156/242 |
| 3,654,012 | 4/1972 | Schlager | 156/286 |
| 3,702,355 | 11/1972 | Hayden | 264/516 |
| 3,775,214 | 11/1973 | Winters | 156/287 |
| 3,878,010 | 4/1975 | Zammit | 264/516 |
| 3,893,882 | 7/1975 | Repenning | 264/553 |
| 3,933,562 | 1/1976 | Cruckshank et al. | 156/287 |
| 4,363,617 | 12/1982 | Hirsekorn | 425/388 |
| 4,474,725 | 10/1984 | Sands | 264/510 |
| 4,555,381 | 11/1985 | Chazal et al. | 264/516 |
| 4,693,507 | 9/1987 | Dresen et al. | 296/39 R |

OTHER PUBLICATIONS

Plastics Engineering Handbook 4th edition, 1976, pp. 276–279.
Gruenwald, Thermoforming-A Plastics Processing Guide, Jun. 19, 1987, pp. 126 and 127.

Primary Examiner—Jill L. Heitbrink
Attorney, Agent, or Firm—Nixon & Vanderhye

[57] ABSTRACT

A method for simultaneously forming and applying a plastic liner to a truck bed is provided wherein a sheet of plastic material is brought into engagement with walls surrounding a truck bed, heated to a pliable state, and forced into close conformity with the contours of the bed by the application of a vacuum from beneath the sheet and/or the application of pressurized air above the sheet.

8 Claims, 2 Drawing Sheets

METHOD OF FORMING A TRUCK BED LINER

This is a continuation of Ser. No. 078,676, filed 7/28/87, now abandoned.

BACKGROUND AND SUMMARY OF THE INVENTION

This invention relates generally to truck bed liners and specifically, to a process for simultaneously forming and applying a plastic liner to a truck bed.

In conventional prior art processes, truck bed liners are formed with costly male and female dies or molds which are designed to mirror the surface contours of a given truck bed configuration. The singular disadvantage of this technique is that individually specialized molds must be designed for each truck bed size and/or style. It will thus be appreciated that great amounts of time, effort and expense are associated with the manufacture of a full line of truck bed liners.

In the present invention, the need for costly male and female mold structures is eliminated. Thus, a novel and inexpensive process is disclosed by which the truck bed itself serves as a female mold. This allows the formation and application of the liner in one, fairly sample and inexpensive step. Moreover, the simultaneous formation and installation of a truck bed liner according to this invention can be performed in body shops, repair shops, or the like.

According to one exemplary embodiment of the process of this invention, a relatively rigid sheet of plastic material, such as polypropylene or polyethylene or other suitable plastic, is brought into engagement with the upper surfaces of the truck bed side walls. Side walls in the context of this invention includes at least the two parallel walls extending the length of the bed and a front wall extending therebetween. The tailgate is not necessarily included. It will be understood that the sheet is oversized in relation to the horizontal bed surface per se, so as to enable the sheet to be initially supported on the side walls. A heater bed including a plurality of electrical coils designed to heat the plastic sheet to a pliable, or semi-solid state is then brought into proximity with the sheet, preferably just above the sheet, by way of an overhead crane or the like.

In order to assure close conformance with the contours of the truck bed side walls and horizontal bed, a vacuum is applied from beneath the plastic sheet while the sheet is being heated. As the sheet reaches a temperature which renders it pliable, the vacuum will draw the sheet down and into engagement with the bed. To this end, one embodiment of the invention requires that a plurality of holes be drilled or stamped in the side walls, front wall and horizontal working surface of the bed. Each hole, or aperture, is provided with a temporarily installed fitting by which a vacuum hose is placed in communication with the space within the bed area. The individual vacuum hoses are connected to a manifold which, in turn, is connected to a suitable vacuum source.

At the same time, or as an alternative means of assuring close conformance between the sheet and the bed, such close conformance, it may be desirable to apply positive air pressure above the plastic sheet. This may be accomplished by attaching or suspending air manifolds adjacent the heater bed, so that air under pressure may be distributed through nozzles provided in the manifolds across essentially the entire upper surface of the sheet.

The pressurized air above and/or the vacuum below the heated plastic sheet insures a precise "fit" of the sheet to the bed. As the sheet cools, it hardens into a tough, durable liner.

In a related aspect, it is recognized that many pick-up trucks have a double side wall construction. In such case, the apertures provided in the side walls need only extend through the inner wall to establish communication with the space between the side walls. One or more additional apertures may then be provided underneath the side walls so that a like number of vacuum hoses can be temporarily attached thereto, for the purpose of pulling a vacuum through the enclosed space between the side walls.

After installation of the liner, excess plastic material around the peripheral edges of the liner is trimmed, and the apertures, at least those on the underside of the bed, are plugged or otherwise treated to prevent corrosion.

In a preferred embodiment of the invention, the bed area is temporarily divided into two, sealed chambers so that air may be drawn from underneath the plastic sheet and air under pressure supplied above the sheet without any necessity for drilling holes in the side walls or bed surface. In this embodiment, the heater bed and pressurized air source are provided within a housing which clamps the plastic sheet to the side walls of the bed, thereby forming a substantially airtight chamber above the sheet. At the same time, the truck tailgate is temporarily replaced by a dummy tailgate which includes a vacuum hose fitting. By this arrangement, a second substantially airtight chamber, defined by the side walls, dummy tailgate and the plastic sheet is formed below the plastic sheet. As the sheet is heated to a pliable state, a vacuum is pulled through the dummy tailgate below the sheet, while pressurized air is supplied above the sheet to force the pliable or semi-liquid sheet into close conformance with all surfaces of the bed and surrounding side walls.

It should be noted that even through the sheet is originally sized to only a slightly larger dimension than the bed surface, and is thereafter clamped about the periphery of the bed, there is nevertheless sufficient material to cover the entirety of the bed and side walls in the process by reason of thinning of the sheet as it is brought into conformance with the surface contours of the bed. In other words, the size and thickness of the original sheet is chosen to insure sufficient material to cover the bed and side walls.

Vacuum pressure sufficient to achieve the desired close fitting relationship between the plastic sheet and truck bed is in the area of 18-26 in. of Hg., while the positive air pressure applied to the upper surface of the sheet is preferably about 20 to about 100 psi, well within the capability of standard air compressors.

Other objects and advantages will become apparent from an inspection of the drawings and detailed descriptions which follow.

DETAILED DESCRIPTION OF THE INVENTION

Figure 1:
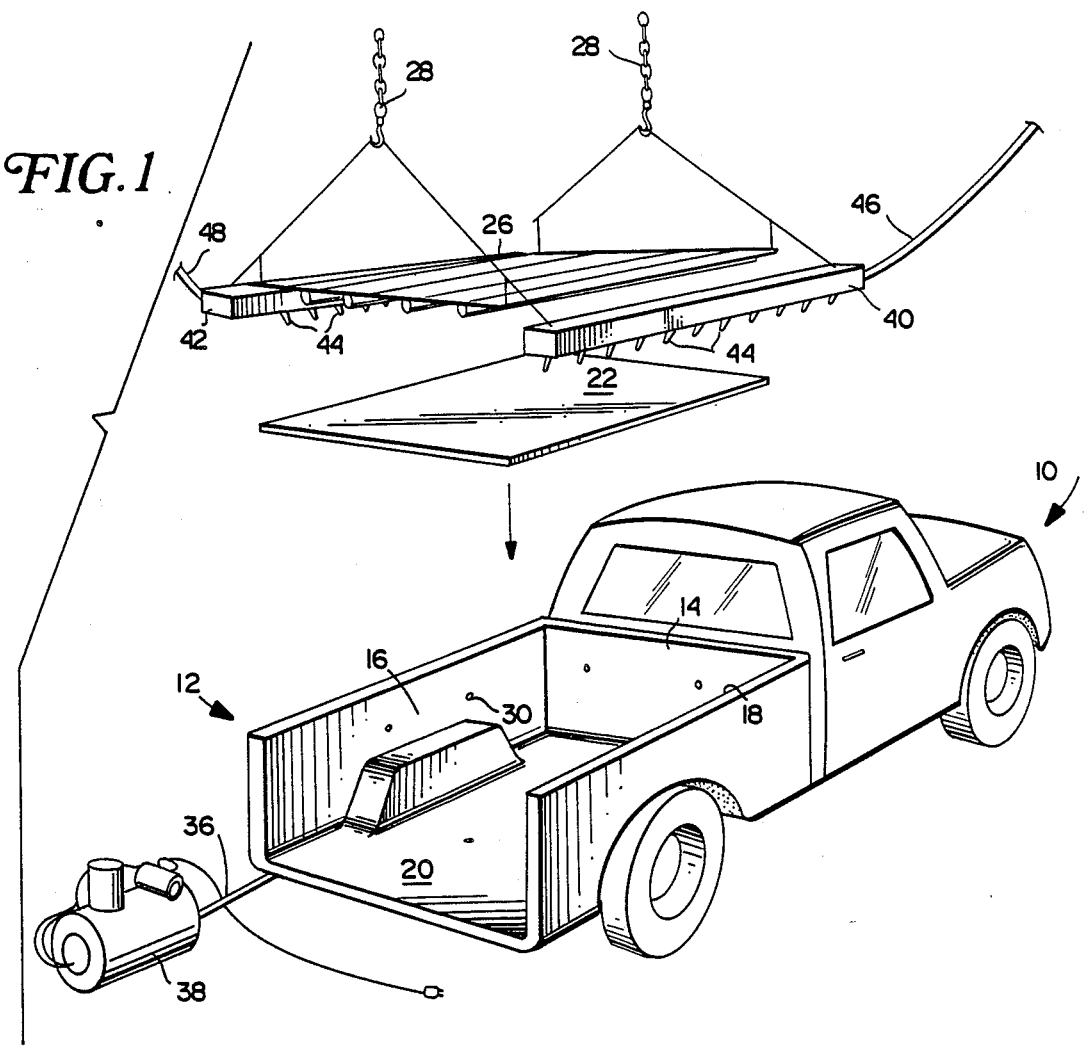
FIG. 1 is an exploded perspective view of a truck, truck bed liner sheet, and associated apparatus for applying the sheet in accordance with one embodiment of the invention.

Referring to FIG. 1, a vehicle 10 of the type commonly known as a pick-up truck is illustrated and is provided with a bed 12 including a front (side) wall 14 and substantially parallel side walls 16, 18 extending the length of the bed in partially surrounding relationship to the horizontal bed surface 20. The tailgate structure, typically provided at the rear of the bed, is removed for the sake of clarity. However, it will be understood that the liner can be applied to the tailgate by the present invention, if so desired.

FIG. 1 also illustrates a fairly stiff rectangular sheet of plastic material 22 which will ultimately become the liner for the bed 12. The liner 22, which may be a plastic material, such as polypropylene or polyethylene, for example, is initially sized to engage the upper or top surfaces of the sidewalls of the bed. A heater bed 26 is shown suspended over the truck bed and sheet by a hoist (not shown) and cables 28.

Prior to placement of the sheet on the truck, a plurality of apertures 30 are drilled into the side walls 16, 18, front wall 14, and the horizontal bed surface 20. In those instances where the side, and possibly front, wall construction is of the double wall type, it will be understood that the apertures need extend only from the interior of the bed area and into the space between the double side and front walls. In this case, additional apertures may be provided from the underside of the truck into the enclosed space between each pair of side walls and/or front walls to provide communication between the apertures 30 opening into the bed area of the truck and the apertures located in the underside of the truck.

Figure 2:
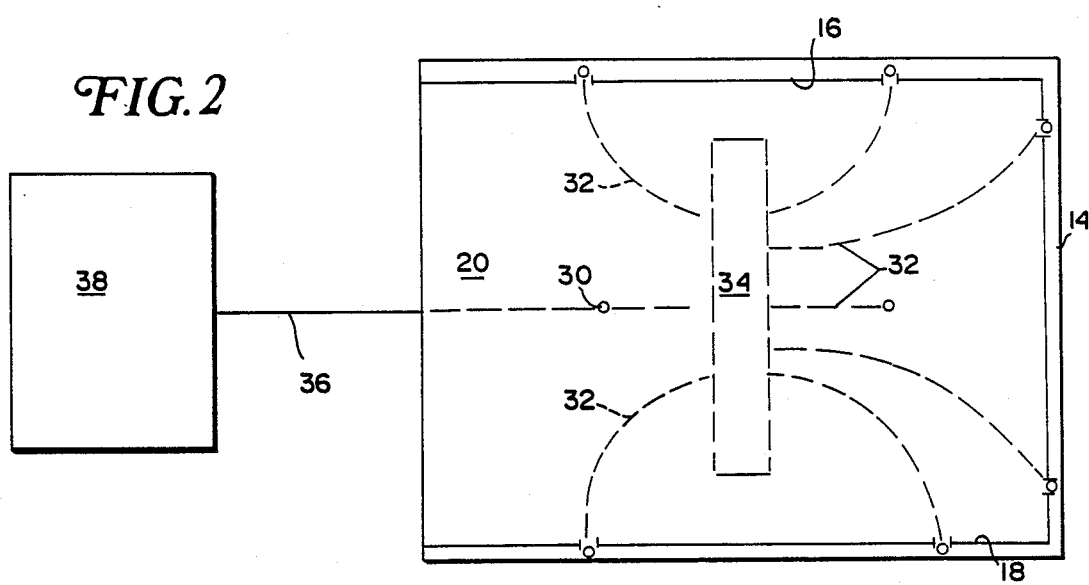
FIG. 2 is a schematic diagram of vacuum applying means attached to a truck bed in accordance with the embodiment illustrated in FIG. 1.

As more clearly shown in FIG. 2, each of the apertures is connected by way of a vacuum hose 32 to a vacuum manifold 34. The vacuum manifold 34 is, in turn, connected by way of conduit 36 to an air compressor 38.

In carrying out the process of this invention, after the liner sheet 22 is located on the upper surfaces of the side walls 14, 16 and 18 of the bed 12, the liner is heated by electrical coils or other suitable means, provided in the heater bed 26, until the sheet is in a pliable, i.e., semi-solid, state. The temperature at which any given plastic material will become pliable, or semi-liquid, is easily ascertained with reference to specifications, etc. which are generally available. At the same time, a vacuum is applied through manifold 34 and hoses 36 to the interior bed area of the truck so that the pliable sheet is pulled down into close conformance with the surface contours of the truck bed side walls and bed surface. As previously indicated, the sheet size and thickness are initially chosen to insure complete coverage of the side walls and horizontal bed surface, with the understanding that the sheet will be thinned as it is drawn into conformance with the bed.

As noted before, it may be desirable to apply positive air pressure above the liner either alone or at the same time as the vacuum is being applied to the underside of the liner. To this end, air supply manifolds 40, 42 may be mounted to either side of the heater bed 26 such that a plurality of air nozzles 44 direct air under pressure to the upper surface of the sheet 22. The air may be supplied under pressure to the manifolds 40, 42 through supply conduits 46, 48 leading to a compressed air source, not shown. It will be understood, of course, that other means may be utilized to direct pressurized air against the upper surface of the sheet.

In the event it is considered desirable to have the bed liner cover the inside surface of the tailgate (not shown), it will be appreciated that the bed may be formed as described above, using an appropriately larger plastic sheet, and wherein an additional cutting step is employed, for example, during trimming, to cut the liner along the edges of the tailgate to permit the normal opening and closing movement of the tailgate.

Once the liner is in close engagement with the contoured surface of the bed surface, the heating bed 26 is raised away from the truck, and the liner is allowed to cool. During this period of time, the edges of the liner are trimmed so as to extend just to the outer edges of the side, front and bed surfaces to provide a neat, custom appearance.

In addition, it will be understood that is desirable to keep the number of apertures 30 to a minimum, but nevertheless sufficient to obtain the desired close fit between sheet and bed. In this regard, it will be understood, that as reliance on pressurized air from above the sheet is increased, the reliance on vacuum from below the sheet may be decreased, with a consequent reduction in the number of apertures in the bed and/or side walls.

In an alternative and preferred embodiment of the bed liner process, there is no necessity to drill holes in the truck bed and/or surrounding side walls, which some owners may otherwise find objectionable. This embodiment is therefore particularly advantageous insofar as no alterations of any permanent nature need be made to the truck bed or surrounding side walls including the tailgate.

Figure 3:
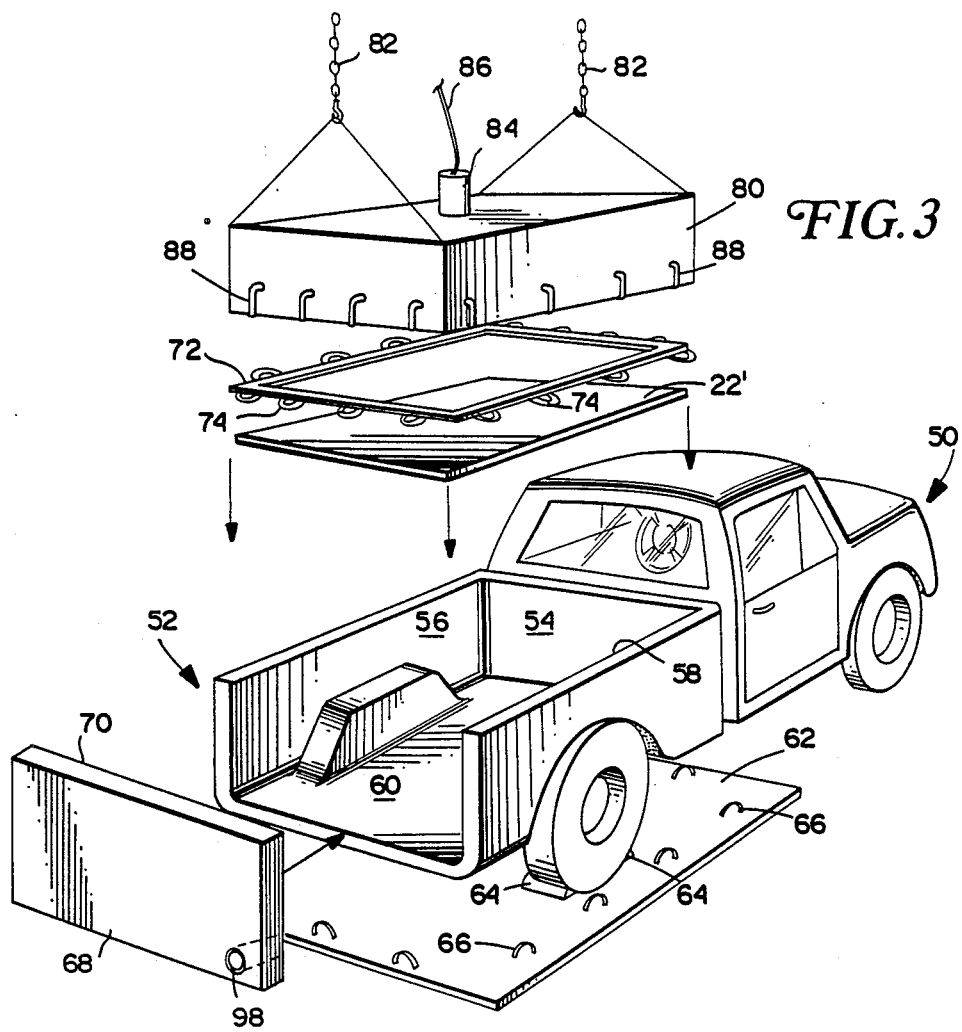
FIG. 3 is an exploded perspective view illustrating a truck, a truck bed liner sheet and associated apparatus for applying the sheet in accordance with an alternative and preferred embodiment of the invention.
Figure 4:
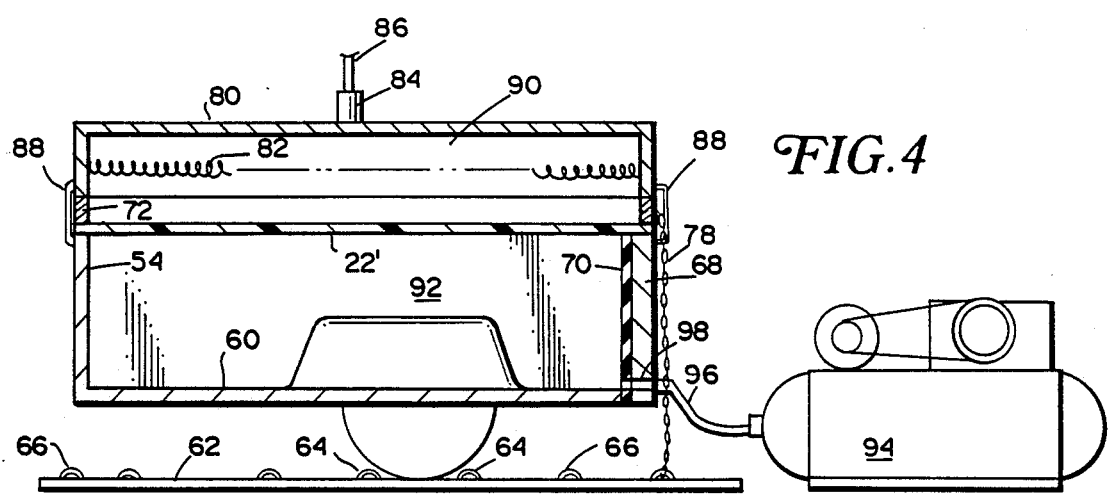
FIG. 4 is a partial side cross-sectional view of the bed illustrated in FIG. 3 but wherein the heater bed is in place atop the bed.

Referring to FIGS. 3 and 4, a truck 50 is illustrated which includes a bed 52 defined by front wall 54, side walls 56, 58, a tailgate (not shown), and a horizontal bed surface 60.

The truck is initially positioned on a tie down plate 62 provided with wheel chocks 64 to prevent movement of the truck, and a first plurality of rigid tie down loops 66 for a purpose to be described hereinbelow.

After the truck is properly located on the plate 62, the tailgate (not shown) is removed and replaced, temporarily, by a dummy tailgate 68, provided with a resilient gasket 70 of any suitable material to insure an airtight seal with respect to the truck bed.

As in the previous embodiment, plastic sheet 22' is then placed on top of the bed, supported by the upper surfaces of side walls 54, 56, 58 and dummy tailgate 68. Thereafter, a rigid tie down frame 72, of a size corresponding to approximately the size of the truck bed and plastic sheet 22', is placed over the sheet, in the general orientation shown in FIG. 3. Subsequently, flexible connectors 78, such as elastic cables, chains or the like, are attached between generally aligned ones of the first plurality of rigid loops 66 and a second plurality of rigid loops 74 provided about the periphery of frame 72. In this way, sheet 22' is clamped to the upper surfaces of bed side walls 54, 56 and 58, as well as dummy tailgate 68.

Thereafter, a heater bank 80, supported via cables 82 from an overhead crane (not shown) or other suitable support means, is brought down into engagement with the tie down frame 72. With reference to FIG. 4, it may be seen that heater bank 80 includes one or more electrical coils 82, or other suitable heating elements, as well as a fitting 84 for receiving a hose 86 connected to a supply of pressurized air (not shown). A series of cam locks 88 of any suitable conventional design, are provided about the periphery of the heater bank for camming engagement with the rigid loops 74 when the heater bank is lowered into seated engagement with the frame 72.

As can best be seen in FIG. 4, once the heater bank is lowered into an operative position as described above, two sealed chambers are created, an upper chamber 90 defined by heater bank 80 and the upper surface of sheet 22', and a lower chamber 92 defined by side walls 54, 56, 58, dummy tailgate 68, and the lower surface of sheet 22'.

The upper chamber receives pressurized air through fitting 84 while, simultaneously, a vacuum may be pulled in the lower chamber 92, by vacuum pump 94 via hose 96 connected to a fitting 98.

As in the previous embodiment, the sheet 22' is heated to a pliable or semi-liquid state, while pressurized air above and vacuum below the sheet 22' causes the sheet to form a bed liner in close conformance to the contours of the bed surface including sidewalls 54, 56, 58, as well as the inner surface of dummy tailgate 68. During the subsequent trimming step, the liner will be slit about the periphery of dummy tailgate so that the latter may be removed and the original tailgate replaced.

It will be understood that if it is desired to provide a plastic liner to the inner surface of the original tailgate, that may be done separately by a different process.

It will be further understood that, in addition to polypropylene and polyethylene, other suitable thermoplastic compositions may be utilized to form the liner, and, in such case, temperature, vacuum, and positive pressure levels may be adjusted accordingly.

It may thus be seen that the invention provides a unique process for the simultaneous formation and application of a truck bed liner to a truck bed in a simple and inexpensive manner which eliminates costly dies heretofore required in the manufacture of truck bed liners. The process has essentially uniform application to truck beds of any size or surface configuration and thus achieves significant advantages over prior manufacturing techniques.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of providing a plastic liner to the bed of a truck without male or female molds, said truck bed defined by a front wall, a pair of side walls, a tailgate and a bed surface, the method comprising the steps of:
    (a) removing the tailgate from the truck;
    (b) installing a dummy tailgate on the truck, said dummy tailgate provided with coupling means for operative attachment to a vacuum source;
    (c) locating a sheet of plastic material on upper surfaces of said front wall, said pair of side walls and said dummy tailgate in substantial alignment with said bed surface;
    (d) clamping said sheet to said truck bed;
    (e) heating said sheet to a pliable state;
    (f) applying a vacuum through said coupling beneath said sheet to draw said pliable sheet into conformance with said bed.

2. A method as defined in claim 1 and including the further step of (g) applying pressurized air above said sheet simultaneously with the practice of step (f).

3. A method as defined in claim 2 wherein said vacuum is applied at approximately 18–26 in. Hg. and said pressurized air is applied at about 20 to about 100 psi.

4. A method as defined in claim 2 wherein steps (f) and (g) are practiced by establishing a first substantially airtight chamber in said bed below said sheet, and operatively connecting said first chamber to a vacuum source; and establishing a second substantially airtight chamber above said sheet, and operatively connecting said second chamber to a pressurized air source.

5. A method as defined in claim 1 wherein step (d) is practiced by locating a tie down frame on top of said sheet and attaching tie down means extending between said frame and a plate located beneath said truck.

6. A method as defined in claim 5 wherein step (e) is practiced by locating a heat bank proximate to said sheet, said heating bank adapted to engage said tie down frame.

7. A method as defined in claim 6 and including the further step of
    (g) applying pressurized air above said sheet simultaneously with the practice of step (f).

8. A method as defined in claim 7 wherein said heater bank and said sheet define a first closed chamber above said sheet, said heater bank including coupling means for operative connection to a source of pressurized air; and wherein said truck bed, dummy tailgate and said sheet define a second closed chamber below said sheet.

* * * * *